US007685929B2

(12) United States Patent
Mainville

(10) Patent No.: US 7,685,929 B2
(45) Date of Patent: Mar. 30, 2010

(54) BORE SEALING TELESCOPIC HOIST

(75) Inventor: Luc Mainville, Joliette (CA)

(73) Assignee: Industries Mailhot Inc., Terrebonne, Quebec (CA)

( * ) Notice: Subject to any disclaimer, the term of this patent is extended or adjusted under 35 U.S.C. 154(b) by 16 days.

(21) Appl. No.: 10/752,345

(22) Filed: Jan. 6, 2004

(65) Prior Publication Data

US 2004/0154237 A1 Aug. 12, 2004

(30) Foreign Application Priority Data

Jan. 9, 2003 (CA) .................................. 2415982

(51) Int. Cl.
*F16J 9/00* (2006.01)

(52) U.S. Cl. ................... 92/51; 92/52; 92/163; 92/143; 92/251; 91/170 R; 91/173; 91/176; 91/181; 91/67 R; 91/189 R; 91/392; 91/168

(58) Field of Classification Search ..................... 52/64, 52/67, 114, 115, 121; 92/164, 165, 79, 165 R, 92/85 B, 143, 169, 251, 253, 51–53, 85 A; 91/24–27, 405–409, 392, 401, 412, 419, 91/167–168, 446, 91, 169, 173, 176, 181, 91/170 R See application file for complete search history.

(56) References Cited

U.S. PATENT DOCUMENTS

| | | | | | |
|---|---|---|---|---|---|
| 2,318,181 | A | * | 5/1943 | Myers | 277/391 |
| 3,508,773 | A | * | 4/1970 | Brown et al. | 403/37 |
| 3,653,302 | A | * | 4/1972 | Notenboom | 92/53 |
| 3,832,937 | A | * | 9/1974 | Moore et al. | 91/167 R |
| 4,003,297 | A | | 1/1977 | Mott | 92/78 |
| 4,726,281 | A | * | 2/1988 | De Filippi | 91/167 R |
| 5,099,748 | A | * | 3/1992 | Neubauer | 91/26 |
| 5,390,586 | A | * | 2/1995 | Jones | 92/79 |
| 5,983,778 | A | * | 11/1999 | Dawson | 92/52 |
| 6,234,062 | B1 | * | 5/2001 | Griffin | 92/23 |
| 6,337,459 | B1 | * | 1/2002 | Terwijn et al. | 219/121.47 |
| 6,450,083 | B1 | * | 9/2002 | Dawson | 92/53 |
| 6,899,014 | B2 | * | 5/2005 | Dawson | 92/52 |

* cited by examiner

*Primary Examiner*—Jeanette Chapman
(74) *Attorney, Agent, or Firm*—Nicholas A. Kees; Godfrey & Kahn, S.C.

(57) ABSTRACT

The present invention provides a telescopic hoist comprising a series of telescopically arranged tubular sections wherein the tubular sections are made in nitrided steel.

2 Claims, 2 Drawing Sheets

BORE SEALING TELESCOPIC HOIST

FIELD OF THE INVENTION

The present invention relates to bore sealing telescopic hoist. More specifically, the present invention is concerned with a bore sealing telescopic hoist formed of a series of telescopically arranged tubular sections having semi-lubricated contact.

BACKGROUND OF THE INVENTION

Telescopic hoists consist of a series of telescopically arranged tubular sections with a cap closing a first end of each section. A second end of each section is mounted with a two-piece cylinder head while an innermost tubular section has a plunger pin eye which threads into the tube section. Such hoists are hydraulically operated to move the tube sections telescopically. The cylinder heads are threadedly mounted to an outer wall at the second end of each section; they are provided with dynamic and static seal means for sealing and with wiper means for removing debris from a surface along which the dynamic seal means slidably contacts.

On the one hand, rod seal type cylinders are known in the art, such as the one described by Mott in U.S. Pat. No. 4,003,297 issued on Jan. 19, 1977, wherein a sealing ring slides on the exterior diameter of each tubular section. This sealing ring as well as the wiper are located in the piston head. In the cases of double action hoists, sealing rings are located on the piston and these sealing rings are not wipers and are subject to contamination. Such a cylinder is a system closed to the atmosphere, so that air cannot enter into the cylinder at each run. The use of a wear ring on each side of the piston is to avoid wear between the piston and the interior wall of the tube. Certain types of wear rings are made of plastic material, which results in some particles to be embedded in the plastic material. The wear ring is mainly an antifriction component, which offers very limited protection against contamination of sealing rings located on the piston.

On the other hand, bore seal type cylinders are known in the art, wherein where the sealing ring slides on the internal diameter of each tubular section. For example, Dawson, in U.S. Pat. No. 5,983,778 issued on Nov. 16, 1999 discloses a single action cylinder that opens when it is fed with hydraulic oil through an inlet 28 located at its base and closes under the load effect applied on its last section. It is an open system, which means that the ambient air penetrates inside the cylinder, by the provision of a breather on each hoist in order to enable ambient air to be introduced into the cylinder. In practice, this breather is very quickly filled which results in causing air to be pushed and aspired through the wipers installed on these piston heads. These wipers therefore are very rapidly damaged thereby leaving debris to contaminate the hoist. Furthermore, the Dawson patent is concerned with providing a telescopic hydraulic hoist made from rolled aluminium stock and it is submitted that aluminum does not have adequate mechanical features to guarantee the structural integrity of a hoist when submitted to high operating pressures (2200 p.s.i.).

OBJECTS OF THE INVENTION

An object of the present invention is therefore to provide an improved bore sealing telescopic hoist.

SUMMARY OF THE INVENTION

In accordance with the present invention, there is provided with a bore sealing telescopic hoist formed of a series of telescopically arranged tubular sections having semi-lubricated contact.

More precisely, there is provided a telescopic hoist comprising a series of telescopically arranged tubular sections, each section having a first end and an opposite second end; each first end having an annular head; sealing means on at least one of the first ends; wherein the tubular sections are formed in a nitrided steel.

Other objects, advantages and features of the present invention will become more apparent upon reading of the following non-restrictive description of embodiments thereof, given by way of example only with reference to the accompanying drawings.

DESCRIPTION OF EMBODIMENTS OF THE INVENTION

Generally stated, the present invention provides a hoist formed of a series of telescopically arranged tubular sections that allows ambient air to freely enter in the hoist between a piston head and tubular section thereof, whereby a material used allows a semi-lubricated contact between each tubular section.

Figure 1:
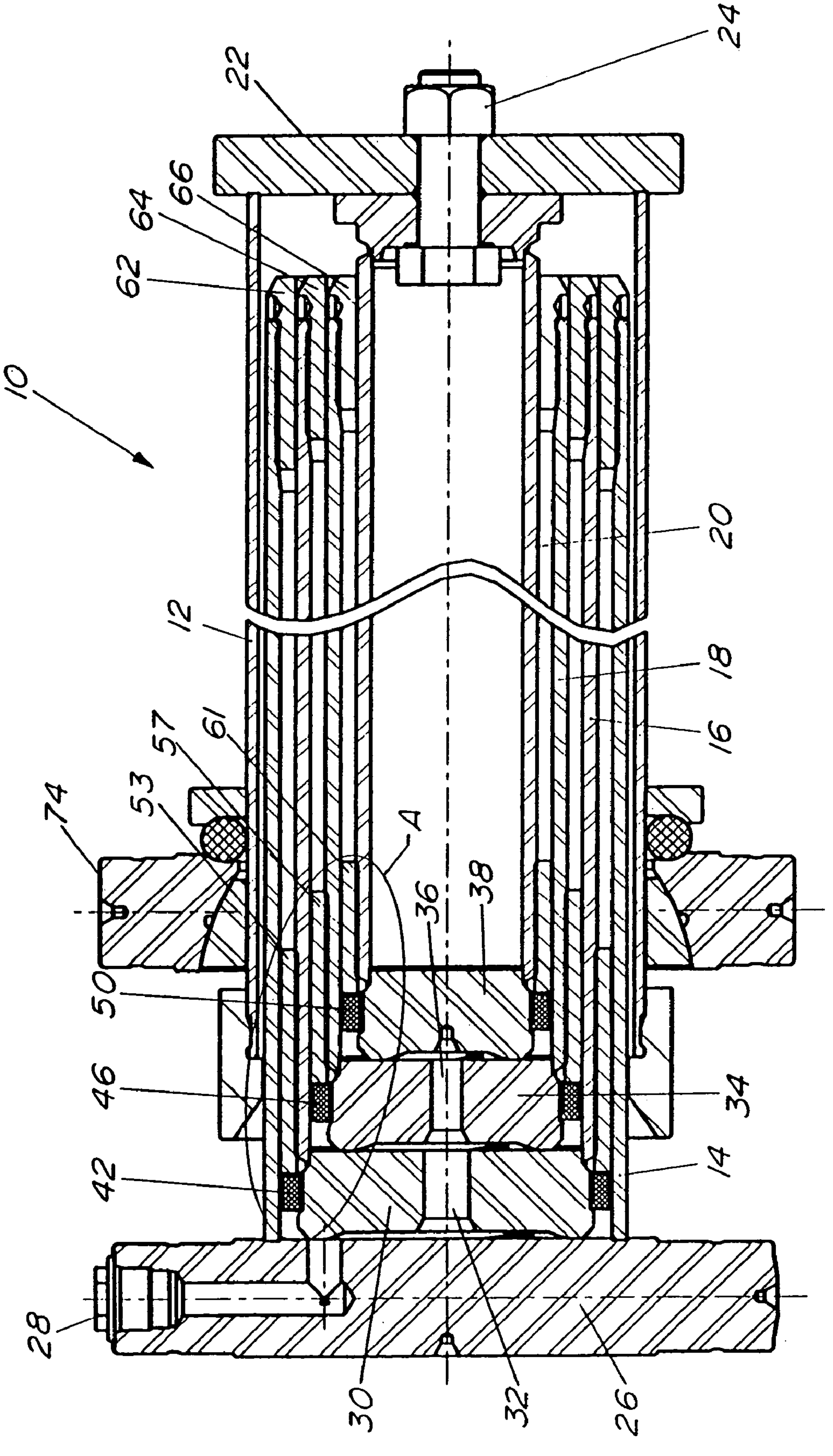
FIG. 1 is an elevation partly cross-sectional view of a telescopic hoist made in accordance with the present invention.

Referring to FIG. 1, a bore sealing telescopic hoist 10 according to an embodiment of the present invention will be more precisely described.

In this embodiment, the telescopic hoist 10 comprises a tubular housing 12, and a series of tubular sections 14, 16, 18 and 20. The tubular housing 12 is closed at a first end thereof by a plate 22, which is secured to the innermost tubular section 20 by a bolt and a nut 24. A second end of the tubular housing 12 is opened to receive the telescopically arranged tubular sections 14, 16, 18 and 20 therein.

The outermost tubular section 14 comprises a head 26, provided with a hydraulic inlet port 28 allowing a fluid to be introduced in a first area enclosed between the head 26 and a piston head 30 of a piston 53,62 of the second tubular section 16. The second tubular section 16 is provided with an opening 32 allowing the fluid to be received in a second area enclosed between the piston head 30 of the second tubular section 16 and a piston head 34 of a piston 57, 64 of the third tubular section 18. The third tubular section 18 in turn is provided with an opening 36 allowing the fluid to exert pressure on a piston head 38 of a piston 61,66 of the fourth tubular section 20.

Figure 2:
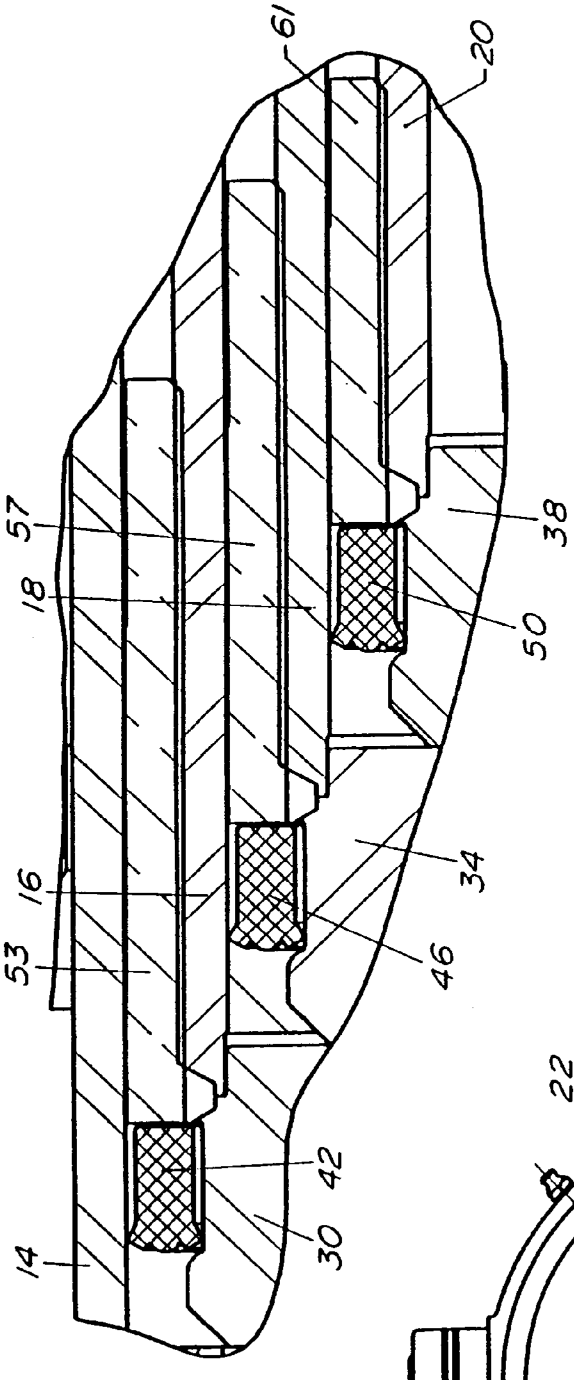
FIG. 2 is an enlarged cross-sectional view showing the arrangement of the cylinder heads with the tubular sections.
Figure 3:
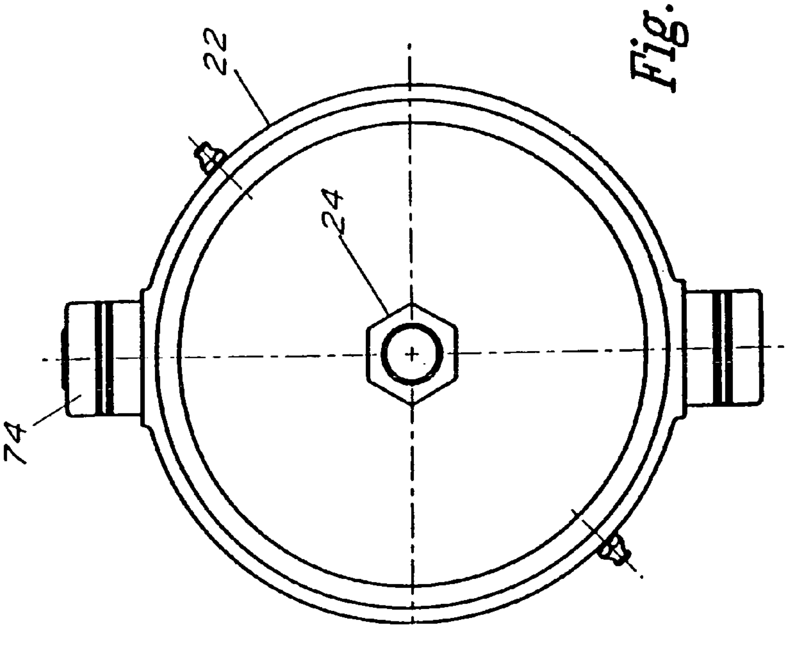
FIG. 3 is an end view of the telescopic hoist as seen from the right of FIG. 1.

As can be best seen in FIG. 2, the piston heads 30, 34, and 38 are shown respectively with a U-shaped cup bore seal 42, 46 and 50, sliding inside respective tubular sections 14, 16 and 18. The U-shaped cup bore seals 42, 46 and 50 provide a sealing wall between the areas where the fluid is present (on the left handside thereof in FIG. 1) and the ambient air, air being maintained in front of pistons 53, 57 and 61.

The fluid used is typically a standard hydraulic oil.

According to the present invention, the tubular sections 14, 16 and 18 are made in a nitrided steel, so that, in operation, when the tubular sections 14, 16 and 18 are telescopically displaced as a result of an introduction of fluid under pressure through the inlet port 28, a film of the fluid is formed on sliding walls of the telescopically arranged and moving tubular sections due to the presence of surface asperities thereon. The contact between each tubular sections is thereby lubricated to an extent allowing the desired performance of the hoist.

Although the present invention has been described hereinabove by way of embodiments thereof, it can be modified, without departing from the spirit and nature of the subject invention as defined in the appended claims.

What is claimed is:

1. A hydraulic bore seal telescopic hoist, comprising:

a cylindrical housing;

a series of fluid pressure actuatable tubular sections telescopically received in said housing, each successive tubular section being of a smaller diameter and nested within each prior successive tubular section such that each tubular section has telescopically sliding surfaces; each said tubular section being open to allow ambient air to freely enter on a first end thereof and each tubular section, other than the tubular section having the smallest diameter, closed by a piston head with an inlet port for passage of a pressure fluid therethrough; and a bore seal mounted in each of said piston heads, for confining said fluid on the second end;

said tubular sections being formed of a nitrided steel such that a film of the fluid forms on and in connection with asperities on the telescopically sliding surfaces of the tubular sections on the second end as they are telescopically displaced under action of the fluid under pressure, such that the tubular sections have semi-lubricated contact between each other.

2. A hydraulic bore seal telescopic hoist as claimed in claim 1, wherein said series of tubular sections comprises an outermost tubular section and at least two inner tubular sections, said outermost tubular section having a head provided with a hydraulic inlet port allowing a fluid to be introduced in a first area between said head and a piston head of an outermost one of said at least two inner tubular sections, said outermost one of said at least two inner tubular sections having an opening allowing the fluid to be received in a second area enclosed between the piston head thereof and a piston head of a successive tubular section, each piston head being provided with a bore seal confining the fluid on the second end of the tubular sections, said tubular sections being formed of nitrided steel such that, when the tubular sections are telescopically displaced under action of the fluid under pressure, a film of the fluid is formed on said telescopically sliding surfaces of the telescopically arranged and moving tubular sections due to a presence of surface asperities thereon, such that the tubular sections have semi-lubricated contact between each other.

* * * * *